United States Patent
Uno

[15] 3,657,985
[45] Apr. 25, 1972

[54] SINGLE LENS REFLEX CAMERA

[72] Inventor: Naoyuki Uno, Oi-Machi, Japan
[73] Assignee: Asahi Kogaku Kogyo Kabushiki Kaisha, Tokyo-to, Japan
[22] Filed: Dec. 3, 1969
[21] Appl. No.: 881,808

[52] U.S. Cl. ................................................95/42, 95/11 V
[51] Int. Cl. ..............................................G03b 19/12
[58] Field of Search...................................95/42, 11; 88/1.5

[56] References Cited

UNITED STATES PATENTS

| | | | |
|---|---|---|---|
| 3,094,911 | 6/1963 | Reiche et al. | 95/42 |
| 3,174,416 | 3/1965 | Heerklotz | 95/44 |
| 3,250,196 | 5/1966 | Ort et al. | 95/44 |
| 3,433,141 | 3/1969 | Ruhle et al. | 95/11 |
| 3,465,660 | 9/1969 | Trankner | 95/42 |

Primary Examiner—Samuel S. Matthews
Assistant Examiner—Michael Harris
Attorney—Stanley Wolder

[57] ABSTRACT

A system for observing through the viewfinder, indicia located on the lens barrel of a single lens reflex camera, comprises a window on the pentaprism housing front wall and a second prism positioned along the pentaprism front face and including a first reflector surface proximate the top of said front face and aligned with the indicia and window, and a second reflector surface proximate the bottom of said front face. Light from the indicia incident on the first reflector surface is directed by the second prism through the pentaprism along a path proximate the pentaprism bottom face to the bottom of the viewfinder eyepiece field of view. A lens registers with the window and is followed by a polarizer filter for blocking horizontally polarized light.

7 Claims, 2 Drawing Figures

PATENTED APR 25 1972

3,657,985

INVENTOR
NAOYUKI UNO

BY Stanley Wolder
ATTORNEY

SINGLE LENS REFLEX CAMERA

BACKGROUND OF THE INVENTION

The present invention relates generally to improvements in cameras and it relates particularly to a single lens reflex camera provided with an improved system for observing through the view finder indicia of selected of the camera settings.

It is highly desirable, in the operation of a camera, to observe the various operating parameters, such as the diaphragm aperture value, shutter speed value, lens distance setting and depth of focus, since the convenient availability of such information greatly expedites the proper setting of the various controls. Many mechanisms and optical systems have been employed and suggested for accomplishing this end but these possess numerous drawbacks and disadvantages. They are complicated and bulky arrangements of little versatility and otherwise leave much to be desired.

SUMMARY OF THE INVENTION

It is thus a principal object of the present invention to provide in a camera, an improved camera setting indicia viewing system.

Another object of the present invention is to provide an improved single lens reflex camera provided with means for observing selected camera setting indicia through the view finder.

Still another object of the present invention is to provide an improved single lens reflex camera provided with means providing a view through the camera viewfinder of indicia carried by the objective lens barrel.

A further object of the present invention is to provide a camera indicia viewing system of the above nature characterized by its simplicity, low cost, convenience and versatility.

The above and other objects of the present invention will become apparent from a reading of the following description, taken in conjunction with the accompanying drawing which illustrates a preferred embodiment thereof.

In a sense the present invention contemplates the provision in a single lens reflex camera comprising an objective lens including a barrel, a viewing system including a pentaprism having a bottom first face exposed to light traversing said objective lens, a front internal reflecting second face, and a rear viewing third face, and an eyepiece exposed to light from said third face, and indicia carried by said camera forward of said pentaprism, the improvement comprising means housing said pentaprism and having a front window therein and means for directing light from said indicia through said window, said second face, said pentaprism, and said third face into the angle of view of said eyepiece.

According to a preferred embodiment of the present invention, the indicia are located on the lens barrel, advantageously on the diaphragm adjusting or setting ring and the lens focussing ring and areas proximate thereto. The light directing means comprises a second prism including a first reflector face located proximate the upper edge of the pentaprism second face and inclined to reflect rays from the indicia traversing the window onto a second reflector face of said second prism located along the lower edge of the pentaprism second face. The second reflector face is inclined to direct the light reflected thereto by the second prism first face rearwardly through the pentaprism to the lower section of the pentaprism rear face and within the lower part of the field of view of the eyepiece. A horizontal cylindrical lens registers with the mirror and a polarizing filter is positioned rearwardly of the lens to block horizontally polarized light.

The improved camera indicia viewing system is simple, highly convenient, versatile, does not interfere with the operation of the camera or the use of the viewfinder and provides a clear and sharp view of the indicia.

DESCRIPTION OF THE PREFERRED EMBODIMENT

Figure 1:
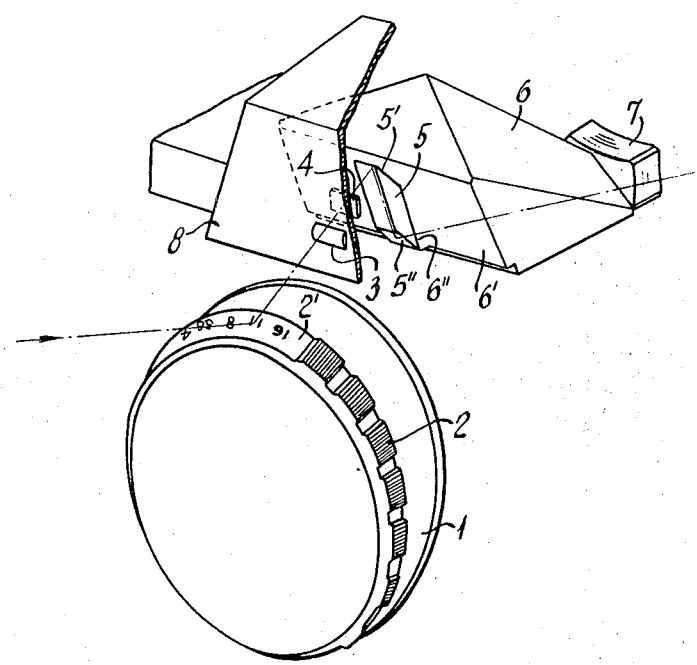
FIG. 1 is a fragmentary perspective view of a camera indicia viewing system embodying the present invention.

Referring now to the drawing which illustrates a preferred embodiment of the present invention, the improved indicia viewing system is embodied in a single lens reflex camera which is of generally conventional construction except as will be hereinafter explained. The camera includes an objective lens system mounted in a barrel 1, the objective lens system lens being provided with a variable aperture diaphragm which is set or adjusted by a ring 2 mounted on barrel 1. Located on the outer face of diaphragm ring 2 are peripherally spaced indicia 2' the upper most of which indicates the size of the adjusted diaphragm aperture the barrel 1 being provided with a suitable indicator mark.

The camera viewfinder comprises a pentaprism 6 of conventional construction enclosed in a housing provided with a front wall 8. The pentaprism 6 includes in addition to its other faces, an entrance bottom first face exposed to light traversing the objective lens and reflected by a retractable mirror in the usual fashion, a front internally reflecting second face 6', and a rear exit third face. A viewfinder eyepiece 7 confronts the pentaprism rear face to provide a through the lens viewfinder.

A prism 5 is medially located proximate the pentaprism front face 6' and includes a top reflector face 5' positioned proximate the upper edge of the pentaprism front face 6' and a bottom reflector face 5'' positioned proximate the lower section 6'' of pentaprism front face 6'. Reflector faces 5' and 5'' may be either total reflecting surfaces or back reflecting surfaces produced by aluminum sputtering. For lengthening the light path, suitable surface mirrors may be arranged at prism faces 5' and 5''. A window is formed in housing front wall 8 between and across a straight line between uppermost indicia 2' on ring 2 and prism reflector face 5'. A horizontal convex cylindrical lens 3 registers with the window in wall 8, it being noted that a transparent plate may be substituted therefor to keep the housing dustfree.

Figure 2:
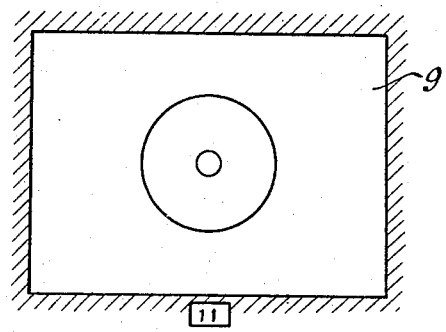
FIG. 2 elevational view of the field of view of the view finder illustrating the view of the observable indicia.

The prism upper reflecting face 5' has a reflecting surface facing uppermost indicia 2' and is inclined to reflect rays therefrom onto prism bottom reflector face 5''. The reflecting surface of reflector face 5'' is directed toward reflector face 5' and is so inclined to reflect the rays from indicia 2' reflected by face 5' rearwardly through prism 6 advantageously out of the effective field of view of the view finder and along a path proximate the bottom face thereof into the lower section of the pentaprism rear face, advantageously outside and adjacent to the lower edge of the observed field of view 9 of the viewfinder, as seen in FIG. 2 of the drawing. Thus the uppermost diaphragm indicia 2' are clearly visible through the camera viewing system including pentaprism 6 and ocular lens or eyepiece 7 and in no way interferes with the normal viewfinding.

Generally, the diaphragm ring 2 is colored black, and the diaphragm value indicia 2' are represented in white characters. When relatively strong light rays, such as those of the sun or of room illumination, fall obliquely on the diaphragm ring 2 as shown by the dot-and-dash lines of FIG. 1, then a portion of the light rays are mirror-reflected, so that the black portion shines brightly. This results in a poor contrast between the black portion and the white characters, making the reading of the diaphragm value indicia 2' difficult. Particularly, when the incident angle of the light rays is greater than the polarization angle, the brightness is even greater and the reading of the diaphragm value indicia 2' is almost impossible.

The mirror-reflected light is considerably linearly polarized so that the major part of it can be absorbed by a polarization filter 4 provided as a polarizing element and advantageously positioned between lens 3 and prism surface 5'. Although the indirect light other than the mirror-reflected light is weakened to ½ - ¼ through the polarization filter 4, the contrast is sharply increased and the diaphragm value 2' can be easily read.

In the example of FIG. 1, the position of the diaphragm value 2' is approximately horizontal so that the polarization of the reflected light is also horizontal. Accordingly it is most effective to orient the polarizer filter 4 with the direction of its absorption axis horizontal.

Thus, by providing the polarization filter in the viewfinder optical system wherein the indications of the diaphragm, the distance, the depth of focus, etc. are visible within the field of view, such indication are readily visible even when the outer light conditions are such as to cause mirror reflection from the surface of the lens barrel because no contrast decrease is caused between such indication and the surrounding area thereby providing the camera user with a great practical advantage.

While there has been described a preferred embodiment of the present invention, it is apparent that numerous alterations, omissions and additions may be made without departing from the spirit thereof.

What is claimed is:

1. In a single lens reflex camera comprising an objective lens including a barrel, a viewing system including a pentaprism having a bottom first face exposed to light traversing said objective lens, a front, internal, view reflecting second face, and a rear viewing third face, and an eyepiece exposed to light from said third face, and indicia carried by said camera forward of said pentaprism, the improvement comprising means housing said pentaprism and having a front window therein, a positive horizontal cylindrical lens registering with said window and means for directing light from said indicia through said cylindrical lens said pentaprism and said third face into the angle of view of said eyepiece and including a first reflector positioned forward of and adjacent to the upper part of said pentaprism second face and a second reflector positioned forward of and adjacent to the lower part of said pentaprism second face, said first reflector being inclined to reflect light rays from said indicia through said window downwardly along a path substantially parallel to said pentaprism second face to said second reflector, and said second reflector being inclined to reflect said indicia light rays from said first reflector along a path rearwardly through said prism to said third face.

2. The camera of claim 1 wherein said indicia are positioned on said lens barrel.

3. The camera of claim 1 wherein said light directing means directs said light from said indicia along a path through said pentaprism substantially parallel to and proximate said first face.

4. The camera of claim 1 wherein said first and second reflectors are defined by the upper and lower inclined faces of an internally reflecting prism member.

5. The camera of claim 1 including a polarizing filter located in the path of light between said indicia and said pentaprism.

6. The camera of claim 1 including a polarizing filter located in the path of light between said indicia and said eyepiece and oriented to block horizontally polarized light.

7. The camera of claim 1 wherein said housing includes a front wall positioned forwardly of said pentaprism second face and said first and second reflectors are disposed between said front wall and said pentaprism second face.

* * * * *